United States Patent [19]

Russell et al.

[11] 4,064,487
[45] Dec. 20, 1977

[54] RECEIVER AND DECODER

[75] Inventors: James B. Russell, Glenshaw; James R. Zewe; John M. Fruhwald, both of Pittsburgh, all of Pa.

[73] Assignee: The Alliance Manufacturing Company, Inc., Alliance, Ohio

[21] Appl. No.: 742,598

[22] Filed: Nov. 17, 1976

[51] Int. Cl.² .................... H04B 1/16; H04Q 9/12
[52] U.S. Cl. .................. 340/168 S; 307/271; 325/392; 340/171 PF; 340/311; 343/228
[58] Field of Search ............ 340/168 R, 168 S, 168 B, 340/167 R, 167 B, 171 A, 171 R, 311, 171 PF; 325/392; 328/25; 179/84 VF; 343/225, 228; 307/271

[56] References Cited

U.S. PATENT DOCUMENTS

| | | | |
|---|---|---|---|
| 3,946,321 | 3/1976 | Krolik | 328/25 |
| 3,973,241 | 8/1976 | Streckenbach et al. | 340/171 A |
| 4,004,276 | 1/1977 | Robinson et al. | 340/171 PF |
| 4,010,423 | 3/1977 | Collins et al. | 325/392 |

*Primary Examiner*—Donald J. Yusko
*Attorney, Agent, or Firm*—Woodling, Krost, Granger & Rust

[57] ABSTRACT

A receiver and decoder is disclosed wherein the receiver may be used as a remote control receiver in conjunction with a transmitter transmitting a carrier modulated with an encoded data train of first and second modulation frequencies for first and second modulation patterns. A third modulation pattern may be established by providing successive portions of the first modulation signal and then the second modulation signal during a given time. If the receiver is on the same carrier frequency and is set to receive the same modulation pattern sequence as in the encoded data train from the transmitter, then the receiver has an output which may be used to control some remote load. This may be a garage door operator to open a garage door, for example.

The decoder in the receiver is responsive to the modulation signals and a signal discriminator discriminates among the three different modulation patterns or logic conditions of bits. A data comparator is connected to receive the logic conditions of the bits and a programmable switch provides a programmable bit input to the data comparator which compares sequentially bit by bit the information from the encoded data train with the information from the programmable switch to determine if they are the same or different. When a group of bits compares favorably then an output signal is given from the decoder to control the remote load. The foregoing abstract is merely a resume of one general application, is not a complete discussion of all principles of operation or applications, and is not to be construed as a limitation on the scope of the claimed subject matter.

19 Claims, 5 Drawing Figures

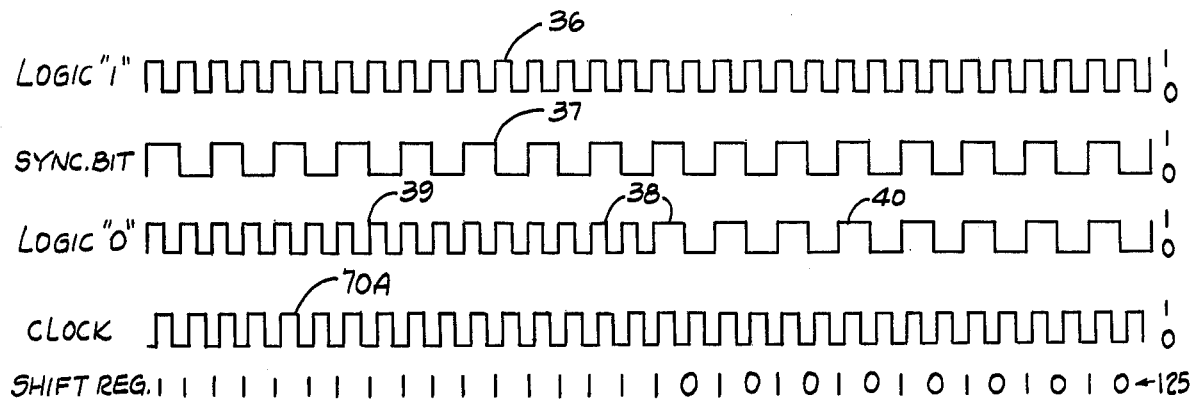
Fig. 2
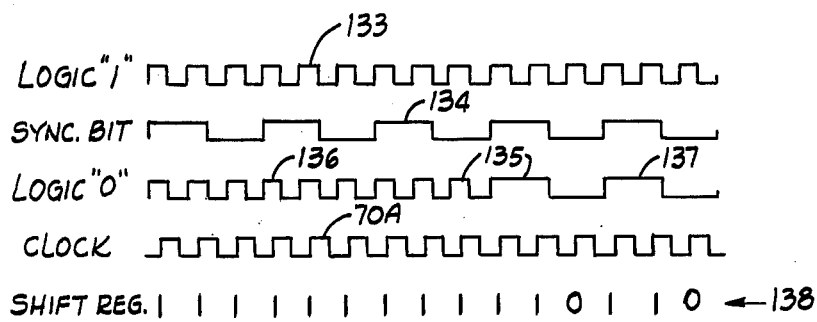
Fig. 3
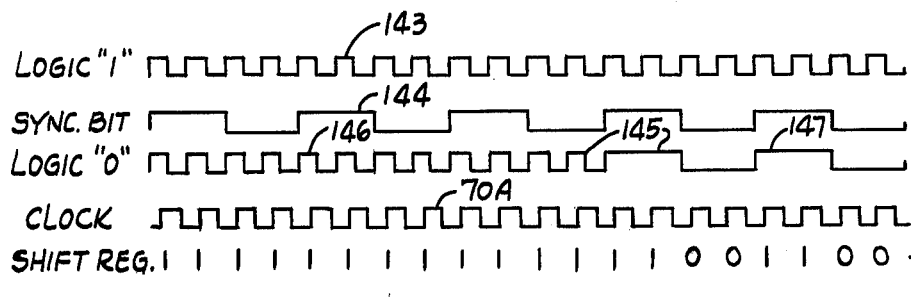
Fig. 4
Fig. 5

RECEIVER AND DECODER

BACKGROUND OF THE INVENTION

Many receivers and receiver decoders have been used to receive a modulated signal so that the receiver output may control some load remote from the transmitter. In remotely controlled devices, radio controlled garage door openers, as an example, there may be an insufficient number of carrier frequencies and modulation frequencies with which to provide sufficient codes so that a neighborhood having many radio controlled garage door operators will incur false operation. There may be interference between two closely adjacent receivers wherein a strong signal from a closely positioned transmitter or the radiation from one of the receivers could energize a relay in a receiver even when the carrier and modulation frequencies in the transmitter and receiver are not the same. One solution was to provide two modulation frequencies both modulating the carrier at the same time and then the receiver had to be on the same code of three different frequencies namely, the carrier and the two modulation frequencies in order to respond to such transmitted signal. Due to the economic limitations, the number of carrier frequencies available was not large. Also the number of modulation frequencies available which were not integral multiples, that is, harmonics of one another, was also not large so that the number of possible codes might be limited to two or three hundred, for example. Often this was insufficient to prevent unwanted actuation of the incorrect receiver and thus opening of a garage door other than the one intended.

One possible solution was to utilize a carrier wave turned on and off by a digital signal. First and second digital signals of two to one ratio of frequencies in phase agreement were utilized and were combined to provide either a short pulse or a long pulse. This gave a pulse train of 9 or 10 pulses of varying pulse widths to turn on and off a carrier wave. A synchronization period of the absence of pulses indicated the end of the message. This message was repeated continuously by the transmitter. If the receiver was on the same code, that is, the same carrier frequency and the same sequence of short and long pulses, then the receiver would have an output and the remotely controlled load would be actuated.

These prior attempts at a receiver decoder had the deficiencies of an insufficient number of codes to be transmitted so as to avoid improper actuation of the receiver. There have been reports that the digital control system has been false triggered by noise such as a teletype signal which also has short and long pulses in its signal. Also such prior digital control system had a lack of a preamble pulse pattern to assure exclusivity of the transmitted and received signal. Also such prior digital system could be easily false triggered by a noise pulse so that the entire train of pulses was dumped at the wrong time.

SUMMARY OF THE INVENTION

The invention may be incorporated in a receiver decoder for use with an encoded data train of three different logic conditions of bits, a first bit being $X$ cycles of a first higher modulation frequency, a second bit being $Y = (X/m)$ cycles of a second lower modulation frequency, and a third bit being the series combination of $nX$ cycles of said first frequency and $(1-n)(X/m)$ cycles of said second frequency, where $X$ and $Y$ are different numbers, $n$ is a number less than one and greater than zero, and $m$ is an integer other than one, said receiver decoder comprising, in combination, a data comparator connected to receive information from said encoded data train, programmable means connected to establish a programmable bit input, means to establish a sequential bit count connected to control said programmable bit input to said data comparator to compare sequentially the programmable bits with the information from the encoded data train for each bit unit of time generated by said sequential bit count means, and means to provide an output signal from said receiver decoder upon the incidence of a given number of bit groups that compare satisfactorily.

An object of the invention is to provide a receiver responsive to a carrier wave modulated by first and second modulation signals in accordance with programmable switch means.

Another object of the invention is to provide a receiver decoder responsive to first and second modulation signals on a carrier wave which signals establish first, second and third modulation patterns.

Another object of the invention is to provide a receiver decoder utilizing a time sequence multiplexer or multiple channel data selector to supply data from a programmable switch to a data comparator at which the data from the programmable switch is compared with the incoming encoded data train.

Another object of the invention is to provide a receiver with a first decoder to decode a first higher modulation frequency, a second decoder to decode a second lower modulation frequency and a third decoder to decode the series combination of cycles of the first frequency and cycles of the second frequency during a unit of time known as a bit.

Another object of the invention is to provide a receiver decoder wherein a sequential count compares sequentially the programmable bits from a programmable switch with information from the encoded data train being received.

Another object of the invention is to provide a receiver wherein a portion of the data bits for comparison may be externally programmable and another portion may be internally programmable.

Another object of the invention is to provide a receiver decoder wherein the encoded data train may be decoded as to the type and number of cycles in a data bit and then further a group of bits making up a word may be counted to determine if the words are good or bad.

Other objects and a fuller understanding of the invention may be had by referring to the following description and claims, taken in conjunction with the accompanying drawing.

BRIEF DESCRIPTION OF THE DRAWING

FIG. 2 is a diagram of the modulation patterns or logic conditions of bits on the carrier wave;

FIG. 3 is a diagram of an alternative modulation pattern;

FIG. 4 is a diagram of a still further modulation pattern; and

FIG. 5 is a chart of possible programming sequences of modulation patterns.

DESCRIPTION OF THE PREFERRED EMBODIMENT

Figure 1:
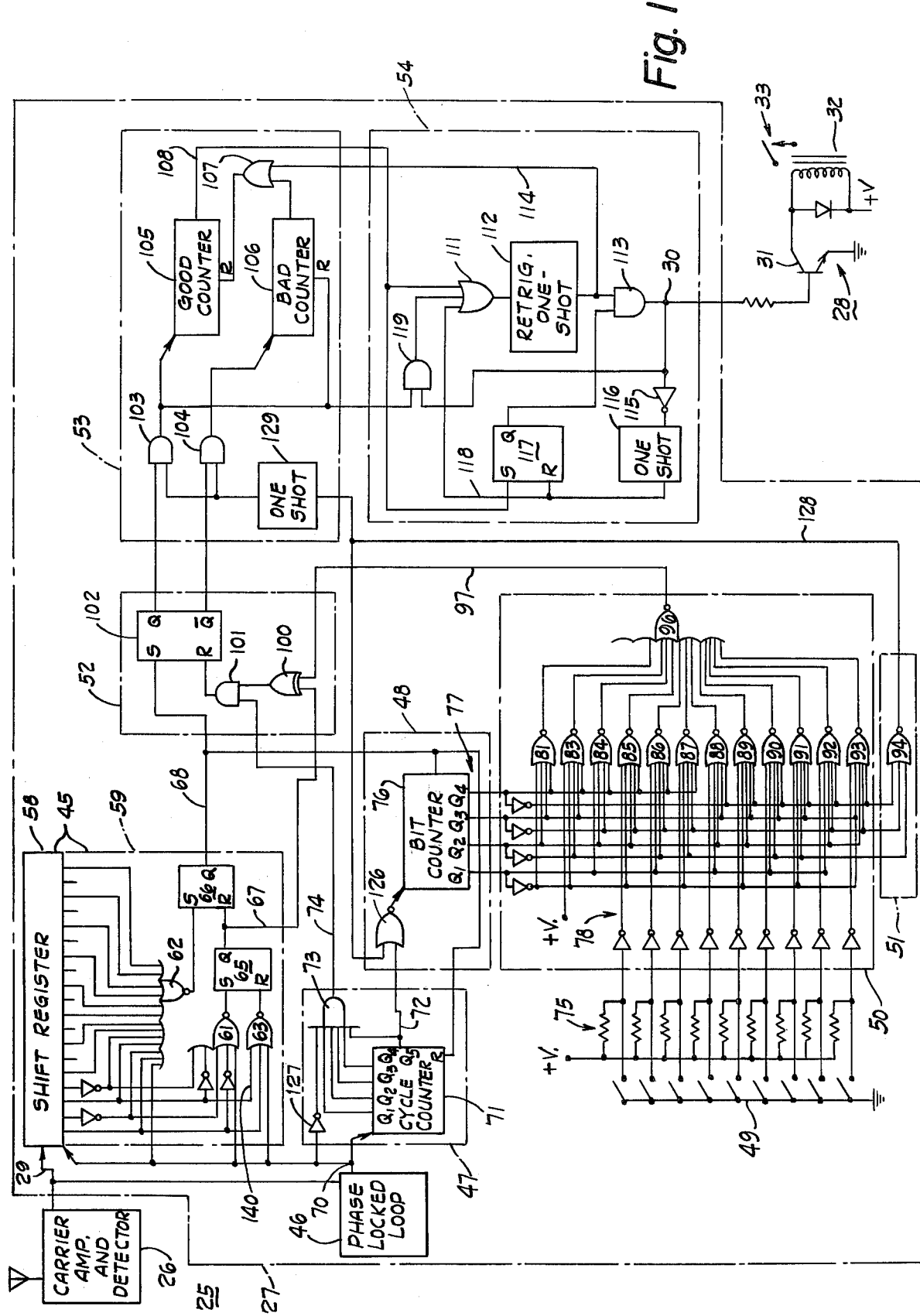
FIG. 1 is a schematic diagram of a receiver according to the invention.

FIG. 1 is a schematic diagram of a receiver 25 incorporating the invention. The receiver 25 includes generally a carrier amplifier and detector circuit 26, a decoder circuit 27 and an output circuit 28. The carrier amplifier and detector circuit 26 may receive incoming signals from a pair of conductors or as shown may receive it from an antenna and hence be a radio receiver. In such case the carrier amplifier may include any one of many usual forms, for example, a superregenerative amplifier circuit and a detector to detect the modulation signal on the carrier and supply it to the decoder circuit 27 on a raw data line 29.

The decoder circuit 27 operates at low power levels and conveniently may be made as an integrated circuit on one semiconductor chip. This decoder 27 is for use with an encoded data train which has three different modulation patterns or logic conditions of bits. A bit is defined in this application as being a definite period of time and a first bit or bit pattern is defined as $X$ cycles of a first higher modulation frequency, a second bit pattern being $Y$ equal ($X/m$) cycles of a second lower modulation frequency, and a third bit pattern being the series combination of $nX$ cycles of said first frequency and $(1-n)$ ($X/m$) cycles of said second frequency, where $X$ and $Y$ are different numbers, $n$ is a number between zero and one, and $m$ is an integer other than one. These first and second modulation frequencies may be in the form of a square wave and the logic bits may be square wave cycles so that the decoder circuit 27 may be considered a digital circuit.

The output circuit 28 amplifies the output from the decoder 27 to greater power levels and when there is an output from the decoder 27 at terminal 30, a driver transistor 31 will be turned on to energize a relay 32 closing contacts 33. These may be used to control an external load. The receiver 25 is one operable as a remotely controlled receiver so that when a given signal is sent by the remotely positioned transmitter with a particular carrier and encoded data train, and the receiver 25 responds to this particular carrier and encoded data train, then the contacts 33 will be closed to control the remotely controlled load. As an example this may be a garage door operator to open and close a garage door.

The decoder 27 is constructed to be responsive to the previously mentioned three different logic conditions of bits. Each bit is a definite period of time as shown in FIG. 2. The first bit pattern is the higher modulation frequency, and as an example this may be considered a logic one condition as shown by the wave form 36. The second bit pattern of a lower modulation frequency may be considered a synchronization bit as shown by wave form 37 in FIG. 2. The third bit pattern may be considered a logic zero bit as shown by the wave form 38 in FIG. 2. This third bit includes a first portion 39 of the first higher frequency and a second portion 40 of the second lower frequency. All of these three bits last for the same length of time and are made up of different numbers of square wave cycles.

A group of bits may be considered as forming a word and the word is repetitively transmitted by the transmitter to be received by the receiver 25. An example of one receiver constructed in accordance with the invention is one wherein the carrier was in the 300 megahertz range, the first modulation frequency for the logic one bit 36 was in the 20 KHz range, the second bit was the synchronization bit 37 and was chosen to be one half the frequency of the first modulation frequency. The third bit was chosen to be the logic zero bit 38 and portions 39 and 40 were chosen to be equal in length of time. Also in this particular example the $X$ number of cycles in the first bit was chosen to be 32 which meant that there were 16 cycles in the synchronization bit 37 and the logic zero bit 38 had 16 cycles of the higher frequency followed by eight cycles of the lower frequency. Also in this example the word consisted of $Z$ (16) bits although this number is not mandatory, it may be more or less than 16.

FIG. 5 is a chart showing the modulation pattern sequence in row 41, with these 16 bits in a word which word is repetitively transmitted. Row 42 shows the logic state for each of these bits, 16 in this example. The first group of bits are internally programmed and the last group are externally programmed as described below. This row 42 shows one example of the possible combination of bits which may be transmitted. With bits 5 through 13 externally programmed this is $2^9$ or 512 different codes for the external program. The internal program includes the fifteenth bit which is the synchronization bit plus six other internally programmed bits which may be either a one or a zero. In the example shown in row 42 of FIG. 5 these have been shown as bit 14 as logic one as well as bits zero, 2 and 3. Bits 1 and 4 have been shown as a logic zero condition, as an example. Including the internally programmed as well as the externally programmed bits, many more codes than 512 are permitted by the present receiver, specifically, 64 $X$ 512 are available with full internal programming.

The decoder 27 of FIG. 1 is constructed to decode the particular logic condition of bits in the word on the received carrier. Where the receiver is used as a part of a transmitter-receiver pair in a remotely controlled receiver, if the transmitter and receiver are on the same code of carrier, modulation frequencies and internally and externally programmed logic conditions of bits, the receiver will respond to this encoded data train and provide an output to the output circuit 28, closing contacts 33.

The decoder 27 includes generally a signal discriminator 45, a phase locked loop 46, a cycle counter 47, a bit counter 48, programmable means 49, a data selector 50, a word pulse decoder 51, a data comparator 52 a counter 53 and a command store circuit 54.

The signal discriminator 45 receives the raw data on the line 29 and discriminates among the three different logic conditions of bits. This signal discriminator 45 includes a multiple bit shift register 58 and decode gates 59. The decode gates 59 include NOR gates connected as first, second and third bit decoders 61, 62 and 63 respectively. In the above example, the first bit is the logic one bit, the second bit is the synchronization bit and the third bit is the logic zero bit. The outputs of the first and third bit decoders 61 and 63 are connected to a data latch 65 and the output thereof together with the output from the second bit decoder 62 are connected to a sync latch 66. The data latch 65 has an output on a decoded data line 67, either a logic one or a logic zero condition on this line namely, a high or a low respectively, signifying the reception of a logic one bit or a logic zero bit, respectively, in the encoded data train. The sync latch 66 has an output on a line 68 which signals the decoding of a synchronization bit and it will be noticed that there is one synchronization bit at the beginning (or end) of each word to signify the start (or end) of such word.

The phase locked loop 46, the cycle counter 47 and the bit counter 48 may collectively be considered as a means to establish a sequential bit count. This sequential bit count may be established directly from the received encoded data train but in many cases it is difficult to exactly synchronize the oscillator in the transmitter with the oscillator in the receiver. Accordingly, the phase locked loop 46 is provided to lock on to the predominant frequency. From FIG. 2, it will be noted that the logic one bit is 32 cycles of the higher modulation frequency, whereas the logic zero bits contain the higher frequency half the time. Therefore as a practical matter the higher frequency is being received about 70 to 80 percent of the time and the phase locked loop 46 locks on to this frequency. The time constant of the loop filter is provided so that even during one synchronization bit, which is the lower frequency, the phase locked loop remains nearly at the higher modulation frequency.

The phase locked loop 46 thus may be considered as a master clock providing a clock output on a line 70. This clock line is supplied to the cycle counter 47 which includes a divider or counter 71 to count the number of cycles in a bit which in the above example is 32 (X) cycles of the higher modulation frequency. The cycle count is provided on a bit pulse line 72 and an output thereon indicates the end of the bit. An AND gate 73 is a bit strobe decoder having an output on a bit strobe line 74 at approximately the end of the bit.

The bit counter 48 includes a counter or divider 76 with multiple outputs on lines 77 to count by a binary code to the count of 16. These output lines are supplied to the data selector 50, and the programmable means 49 is also connected to this data selector 50. The programmable means may be jumpers or may be mask selectable connections to ground or to operating voltage within the integrated circuit, but as shown, this programmable means 49 is a programmable switch. The switch is a multiple pole switch in this case with nine poles to select $2^9$ externally programmable codes. The switch poles may be double throw but as shown may have one pole connected to ground and the other pole connected through a pull up resistor 75 to the operating voltage. When a particular switch pole is closed grounding the switch for a programmed one, a logic one condition on an input of a respective gate in the data selector 50 is provided through respective inverter 78. There are as many gates as there are poles of the programmable switch 49 and in this case there also are additional gates. The gates are NOR gates numbered 81 and 83 through 94 and these gates decode the bit counts of one and three through fourteen respectively. These gates 81–94 have inputs from the lines 77 from the counter 76 which provide the proper binary input to these gates to decode these bit counts. All of these gates are connected through a NOR gate 96 to supply an output on a programmable data line 97 which supplies an output to the data comparator 52. This output on the data line 97 is a serial output sequentially bit by bit of the data programming within the receiver 25.

The data comparator 52 takes the information received from the signal discriminator 45, which is the information as to the logic condition of the received bits, to see if they compare favorably or unfavorably with the condition of the bits as established on the programmable data line 97. The data comparator 52 includes an Exclusive OR gate 100 receiving information from the data line 97 and the decode data line 67. The data comparator 52 also includes a reset enable gate 101 and a presumed good latch 102 receiving a signal from the sync line 68.

The data comparator 52 supplies an output to the counter 53. This counter counts increments or groups of bits which may be a part of a word or a plurality of words, but in the preferred embodiment shown counts complete words. These word counts are passed through good and bad strobe gates 103 and 104, respectively, to good and bad counters 105 and 106, respectively. A reset OR gate 107 is connected to the reset input of the good counter 105. The good counter 105 has an output on line 108.

The line 108 goes to the command store circuit 54 which includes a one-shot input OR gate 111 having an input from line 108. This OR gate is connected to a retriggerable one-shot 112 which is in turn connected to an output inhibit gate 113 on a line 114.

The gate 113 has an output to the terminal 30 leading to the output circuit 28. Terminal 30 is also connected through an inverter 115 to a one-shot 116 which leads on a line 118 to the reset terminal of a command inhibit latch 117. This line 118 is also connected to an input of the OR gate 111.

An output hold gate 119 is an AND gate having an input from the good strobe gate 103 and having another input from the output line 30, with an output to the gate 111. This command store circuit 54 is enabled whenever a sufficient number of good words have been counted and thus the receiver circuit is satisfied that it is receiving the proper encoded data train. The command store circuit 54 incorporates a time delay to prevent relay chatter such as that of the relay contacts 33 in the output circuit 28. It is not desired to have these contacts chatter on and off so the command store circuit 54 makes certain that these contacts stay closed for a particular time period and upon the termination of an output on terminal 30, these contacts will stay open for a time period.

OPERATION

The phase locked loop 46 has its center frequency tuned to the first modulation frequency. In the above example this might be in the range of 20 KHz. Since the transmitted signal for the majority of time is on this first modulation frequency, the phase locked loop 46 locks on to this signal. When the input signal on the raw data line 29 switches to the lower second modulation frequency, the output of the phase locked loop 46 remains nearly at the first modulation frequency until the input signal returns to this first modulation frequency, because the time constant of the loop filter is much longer than the duration of the approximately 10 KHz second modulation frequency signal. Due to the nature of the phase locked loop 46, the clock output on line 70 is lagging the input signal by 90°. This phase locked loop 46 therefore becomes the master clock for the decoder 27 and is the same frequency as the received first modulation signal and the same modulation frequency as the transmitter of the transmitter-receiver pair.

The raw data on line 29 is loaded into the shaft register 58. In the example given this is a 32 bit shift register but only 19 bits are used in this particular receiver embodiment 25. The information is loaded into the shift register on the positive going or logic one transition edge of the clock. Since the clock line 70 lags the raw data by 90°, when the first modulation signal or 20 KHz signal is being received, the shift register 58 is loaded with all logic ones.

FIG. 2 shows the clock signal 70a on line 70 as 90° lagging the high frequency signal 36. Row 125 in FIG. 2 shows that during the reception of a logic zero bit, all ones are loaded into the shift register, at the first portion of this row 125. When the second lower modulation frequency is being received, the shift register is loaded with alternate logic ones and logic zeroes. (See the latter portion of the row 125 of FIG. 2.) In this example, the first bit decoder 61 is considered as decoding a logic one bit. This it does because all of the inputs to it are inverted which come from the shift register 58, therefore when the shift register has all ones on the first four outputs, there will be four logic zero inputs to the NOR gate 61. When the clock line 70 goes from a high to a low, namely a logic zero, all inputs will be zero to give a logic one output on the first bit decoder 61 which sets the data latch 65. This first bit decoder 61 may decode any desired plurality of the outputs of the shift register 58 and in the preferred embodiment this has been chosen as the first four outputs. When they are all a logic one, this is considered an indication that the incoming data bit is a "logic one". Accordingly, the data latch 65 is set.

The third bit pattern decoder 63, in the example of the preferred embodiment, is chosen to decode a logic zero. From the last portion of row 125 of FIG. 2 it will be seen that during the reception of this logic zero bit condition, alternate shift register outputs are zero. Accordingly, a selected plurality of alternate shift register outputs are connected to this third bit decoder 63. In the preferred embodiment the first and third outputs of the shift register are connected to this third bit decoder and if the incoming bit is a logic zero bit, when the clock line goes low, thus putting all zeroes on the input of the gate, the third bit decoder 63 will decode the data as a zero and reset the data latch 65. The data latch 65 is an R-S flip-flop, in which Q goes to a logic one upon a one input to the set terminal S. It is reset to Q = 0 by a logic one on the reset input R. In the preferred embodiment the logic zero condition is decoded and defined as O, N, O, which means that the second output of the shift register may be either logic state, zero or one. It will be noted that the first and third bit decoders 61 and 63 are both inhibited until the clock line 70 goes low.

The second bit decoder 62 in the above example is connected to decode the synchronization bit and as seen in FIG. 2, this synchronization bit 37 is the low frequency signal for the entire bit. In the preferred embodiment the synchronization bit is decoded as the shift register condition of 0, 1, 0, 1, 0, N, 0, N, 0, N, 0, N, 0, N, 0, N, 0, N, 0. The first five outputs of the shift register must be precisely 0, 1, 0, 1, 0 but from then on the even numbered outputs may be either a zero or a one because they are not connected to the second bit decoder 62. This second bit decoder may be made more or less stringent in its decoding requirements by connecting to a greater or lesser number of the outputs of the shift register 58. In the preferred embodiment, the second decoder 62 has inputs from more than eight alternate outputs of the shift register 58 in order to make certain that the last half of the logic zero bit is not decoded as a synchronization bit. It will be noted that if the signal is received noise free, then the logic zero bit will be loaded into the shift register 58 as shown in row 125 of FIG. 2. Similarly the logic one bit would be loaded into the shift register as all ones and the synchronization bit 37 would be loaded into the shift register as a total of thirty-two alternate ones and zeroes.

When the synchronization bit is decoded by the second bit pattern decoder 62, the sync latch 66 is set and the sync line 68 goes to a logic one condition. When a logic one is decoded by the first bit decoder 61, the data latch 65 is set and the decoded data line 67 goes to a logic one, which resets the sync latch 66, and the sync line 68 goes to a logic zero.

The phase locked loop 46 drives the cycle counter 47 and the bit counter 48. The cycle counter 71, by counting the clock line 70, develops a bit pulse on the bit pulse line 72. In the above example of thirty-two cycles of the higher modulation frequency in one bit, the counter 71 is a five bit counter so that it counts thirty-two clocks and then develops an output on the bit pulse line 72. The bit strobe decoder 73 is an AND gate and provides a logic one output on the bit strobe line 74 at the cycle count of 31½ and goes to a logic zero on the cycle count of 32. This is used to enable the data comparison in the data comparator 52 at the end of each bit, with 16 bits in each word, in the above example. The bit pulse line 72 increments the bit counter 76 through a count inhibit gate 126 at the end of each bit. The cycle counter 71 is clocked by the clock line 70. It is reset by the sync line 68. When reset, this counter 71 is preset to a count of three so that it is synchronized with the actual cycle count, because the sync line 68 does not go low until the cycle count of three.

The bit strobe decoder 73 is an AND gate. On the cycle count of thirty-one the binary 1, 2, 4, 8 and 16 lines of counter 71 are all high. One half cycle count later, when the clock line 70 goes low, and is inverted by an inverter 127, and thus goes high, the output 74 of the bit strobe decoder 73 goes high. One half a cycle count later the outputs of the counter 71 will go low so the bit strobe line 74 goes low. The bit pulse line 72 goes high on the binary count of 16 and low on the count of thirty-two because it is connected to the divide by thirty-two output of counter 71.

The bit counter 48 is a means to establish a sequential bit count. It does this on lines 77 by a binary count of zero through fifteen. This binary count sequentially enables the 16 to 1 line data selector 50. The programming switch 49 is a programmable means to selectively apply either a logic zero or a logic one condition on the inputs of the gates 85 through 93. These gates 85 through 93 are selectively set to decode the binary counts of five through thirteen, respectively. Suppose the uppermost pole of the switch 49 is closed, grounding the input to the respective inverter 78 and the output of logic one is applied to the input of gate 85. When the bit five is decoded by the counter 76, all four inputs to this gate 85 from the counter 76 will be low, thus the logic one condition from inverter 78 will be clocked through gate 96 during this bit count of five period to appear as a logic one on the programmable data line 97. Now suppose that the second pole of the programmable switch 49 is open, then the "1" potential through the pull up resistor 75 places a logic one on the respective inverter 78 for a logic zero on the output thereof applied to the gate 86. When bit six is decoded by the counter 76, all four inputs to the gate 86 from the counter 76 will be low, and the logic zero condition from inverter 78 will be clocked through gates 86 and 96 to be a logic zero on programmable data line 97. This data line 97 thus contains, bit by bit, the data that the decoder 27 is programmed to receive by the programmable means 49.

Gates 81, 83 and 84 are examples of one or more optional gates which may be provided to establish an internal programming or preamble, and are not connected to the programmable switch 49. These gates are internally programmed, such as by jumpers or by mask defined connections in the integrated circuit to either ground or the operating voltage. Gate 81 has four inputs connected to outputs of the counter 76 in a manner to decode the bit count of one. Accordingly when the bit count of one occurs, all inputs will be low, the output of gate 81 will go high and the output of gate 96 will be low. Thus gate 81 will set a logic zero condition on the programmable data line 97 for the time period of bit one. FIG. 5 shows that for bit one or modulation pattern sequence one, the logic state of zero is desired. Gate 81 will provide this logic zero condition on line 97 during this bit one.

In FIG. 5 the bit count of four has been shown as logic zero, as an example of internal programming. At the count of four all inputs to gate 84 will go low establishing a high output which is one of the multiple inputs to the gate 96. Thus during the count of four gate 96 will have a logic zero output. There is no need to include a fifth input to gate 84 so long as logic zero input condition is desired.

Gate 83 is shown with five inputs, four of which are connected to the terminal 77 to decode the bit count of three. At the count of three these four inputs go to a logic zero and thus the fifth input is that which controls during the count of three. This fifth input is connected to the internal operating voltage which is a logic one. The logic one provides a logic zero on the output of gate 83 and a logic one on the output of gate 96. There is no gate set to decode the bit count of two. Accordingly, at the bit count of two, there is no gate 81-94 which will have all zero inputs, hence each gate 81-94 will have a logic zero output, for a logic one on data line 97. Thus it will be seen that during the bit count of two and the bit count of three the output of gate 96 is a logic one hence there really is no need to provide a gate such as gate 83 when a logic one condition on the output of gate 96 is desired, one might as well omit such gates. Accordingly, the gates for the bit counts of zero and two have been omitted since it is desired in this particular example that they be a logic one condition.

The word pulse decoder 51 decodes on bit number fourteen and also on fifteen so that the stop line 128 goes high which fires a word strobe one-shot 129 and also inhibits the bit counter 76 through the count inhibit gate 126.

The counter 76, once inhibited by the stop line 128 going high, which occurs when the word pulse decoder 51 decodes a count of 14 on the binary output lines 77, cannot again count until first reset by the sync line 68 so that the stop line 128 returns to a logic zero. Of course, at that point the counter 76 is further inhibited until the reset is released by the sync line 68 going low.

The data comparator 52 compares bit by bit the incoming data decoded on line 67, and the programmed data on the data line 97, at the end of each bit. It will be recalled that the bit strobe decoder 73 is enabled at the cycle count of 31½ and by that time the data line 67 from the encoded data train and the programmed data on the programmed data line 97 will have settled down. The comparator presumed good latch 102 is set, namely, Q equals logic one equals a good word, once at the beginning of each word by the sync line 68. The exclusive OR gate 100 compares the data line 67 and the programmable data 97. As long as these two lines are at the same logic state, both logic ones or both logic zeroes, the output of gate 100 will be a logic zero. If the inputs differ, namely, do not compare, the output of gate 100 will be a logic one. At the cycle count of 31½, which is one half cycle before the end of a bit, the bit strobe line 74 goes to a one enabling reset enable and gate 101. This allows the logic one, which if present due to the data on data line 67, not comparing with the programmed data on line 97, to be clocked through to the reset input of the presumed good latch 102, causing a bad indication to be stored in the latch 102 for the duration of that particular word, namely Q equals a logic zero equals a bad word. The presumed good latch 102, remains reset once a bad indication is encountered until the beginning of the next word when set by the sync line 68 going high. This is the reason for the term "presumed good". The word is presumed good until a bad bit is encountered. If a bad bit is encountered, the word is considered bad. If all the bits compare and thus latch 102 is not reset, at the end of the word when the output of the latch 102 goes to the next stage 53 it is presumed that the word was good since a bad bit was never encountered. Any bad bit in a word makes the word bad, all bits have to be good for the word to be good.

At the end of the word at the bit count of fourteen, when the stop line 128 goes high, the word strobe one-shot 129 is fired enabling the good and bad strobe gates 103 and 104, which strobe the word good or word bad information into the respective word good or word bad counters 105 and 106.

The good counter 105 is reset by the bad counter 106, whenever the bad counter reaches a preset number. This might be any number such as 1 through 10 and in the preferred embodiment the count of four has been used. The reset is applied through OR gate 107. The bad counter 106 is reset by a preset number of good words counted which might be any number from 1 through 10 for example, and in the preferred embodiment this number is one. Accordingly, FIG. 1 shows that the bad counter is reset by the output of the good word strobe gate 103. Thus every time a good word is decoded, the bad counter 106 is reset, and every time four bad words in a row are counted, the good counter 105 is reset. When the good counter 105 gets to the predetermined number such as 1 to 10, in this example the count of four, the good decode line 108 goes to a logic one.

The predetermined number, such as 1 to 10, is determined in advance by many factors. If a more secure system is desired a higher number is chosen. If the system will be used where noise and occurrence of false signals are very minor or not a problem, then a lower number is chosen. Experience has shown that choosing four as the predetermined number is a practical balance among security, economy, time lapse for actuation and freedom from being blanked by noise.

The command store circuit 54 is interactive with the word counter 53. When the good decode line 108 goes to a logic one, the command inhibit latch 117 is set which enables the output inhibit and gate 113. At the same time the good decode line 108 through OR gate 111 triggers the retriggerable one-shot 112. The output 114 of the one-shot 112 goes to a logic one and through OR gate 107 resets the good counter 105, holding it to a count of zero. This causes the good decode line 108 to go back to a logic zero. The output 114 of the retriggerable one-shot 112 also goes to the output inhibit gate 113. The output of this gate is the output 30 of the decoder 27, and it goes to a logic one. This enables the output hold AND gate 119. As long as a good word is decoded during the time constant of the retriggerable one-shot 112, the one-shot will be retriggered through OR gate 111 by the output of the output hold gate 119 going to a logic one by the output of the good counter strobe gate 103 going to a logic one. Stated another way, it takes four good words with no more than three bad words between each good word to enable an output at the output 30. Once this output has been enabled, it takes one good word sometime during the time constant of the retriggerable one-shot to retrigger this one-shot holding the output on for another time constant period. This time constant may be any desired amount, for example two tenths to seven tenths of a second.

When the retriggerable one-shot 112 finally times out, and its output goes to a logic zero, the output line 30 also goes to a logic zero. This disables the output hold gate 119 and prohibits the one-shot 112 from being retriggered through the word good strobe gate 103. At this time the one-shot 116 is triggered through inverter 115, causing the output 118 of the one-shot 116 to go to a logic one for a small period of time. This resets the command inhibit latch 117 which disables the output inhibit gate 113 and also triggers the retriggerable one-shot 112 through OR gate 111. The output 114 of the retriggerable one-shot 112 inhibits the good counter by keeping it reset through OR gate 107. It will be noted that the output line 30 cannot go to a logic once since it is inhibited by gate 113.

When the retriggerable one-shot times out after this output disable period, the reset is taken off the good counter 105, thus allowing the entire output sequence to begin again. The retriggerable one-shot 112 thus does double duty of keeping the relay 32 energized for at least a minimum time period once it has been energized and then maintaining it deenergized for a time period once it has been deenergized. This is accomplished because once the output 30 goes to a logic one, only one good word is needed per time constant period to keep this output at a logic one. Once this does not occur, the same retriggerable one-shot 112 disables the output for a time constant period, insuring a minimum off time which eliminates chatter of the relay contacts 33 and chatter of the load controlled by such contacts.

The signal discriminator 45, it will be noted, does not decode the entire logic bit one nor the entire logic bit zero nor for that matter the entire synchronization bit. Also, it is not mandatory that all the words be counted good in the word counter 53, which are present in the particular message. In the above example of the first modulation frequency being about 20 KHz, with 32 cycles of this frequency being the time period of a bit, with 16 bits comprising a word, and with the words repetitively transmitted, this calculates to about 625 bits per second and about 40 words per second. Now if the transmitted message lasts for about one second, this is a total of about 40 words. The present receiver is very selective and able to resist false operation to a high degree. First, the carrier frequency of the receiver must be correct for the transmitted carrier. Second, the first modulation frequency must be within the locking range of the phase locked loop. Third, the second modulation frequency must be the proper fraction of the first modulation frequency, namely $X/m$ which in the preferred embodiment is $\frac{1}{3}$ the frequency of the first modulation frequency. Fourth the $2^9$ or 512 possible codes set by the programmable switch 49 must agree with the encoded data train received by the receiver 25. Fifth, the internally programmed preamble of $2^6$ or 64 codes must agree with that on the encoded data train. All of these make the receiver very secure against false operation. It is possible to make the signal discriminator 45 more or less selective in its decoding of the first, second and third bits and it is also possible to make the word counter 53 more or less selective in the number of good word counts before it is decided that a good message is being received. Thus the receiver 25 has considerable flexibility in its ability to meet unusual conditions of reception such as unusual noise or repetitive noise or even noise which is at about the first or the second modulation frequencies.

The signal discriminator 45 has been shown as connected to the decoder gates 61, 62 and 63 to decode the endcoded data train shown in FIG. 2. FIG. 3 shows an alternative data train to which the receiver 25 may be made optionally responsive. In this FIG. 3, X, the number of cycles in the first modulation frequency is not 32, it is 15 for a logic one bit. The numeral $n$ is six tenths, $m$ is three and therefore $Y$, the number of cycles in a sync bit, equals $(X/m)$ equals (15/3) equals 5. The logic one bit of 15 cycles is shown at 133 in FIG. 3. The sync bit of five cycles is shown at 134. The logic zero bit is shown at 135 and includes a first portion 136 of nine cycles of the higher frequency and two cycles of the lower frequency in the second portion 137 of the bit. The clock output is shown at 70a and the shift register output is shown at row 138 when a logic zero bit is loaded into the shift register without noise. This shows that during reception of the second frequency, as at portion 137 of the logic zero bit, a zero occurs on every third output of the shift register. Accordingly, to decode this logic zero bit it will be necessary only to move the line 140 on the input to the zero decode gate 63 over to the fourth output of the shift register rather than being connected to the third output as shown. This would be a simple internally programmed change in the integrated circuit of the decoder 27.

For the encoded data train as shown in FIG. 3, no change will need to be made to the logic one bit decoder 61. The sync bit decoder would need to have its input connections changed in their connection to the shift register to reflect the changed data as shown in row 138 of FIG. 3. For example, it could be connected to recognize the logic zeroes on every third shift register output such as 1, 1, 0, 1, 1, 0, N, N, 0, N, N, 0, where N is any logic state either logic one or logic zero.

FIG. 4 is a group of diagrams illustrating a still further encoded data train to which the receiver 25 may be made optionally responsive. The logic one bit is shown at 143 as consisting of 20 cycles of the first modulation frequency so $X$ equals 20. The sync bit is shown at 144 as consisting of five cycles of the second lower modulation frequency so that $Y$ equals $(X/m)$ and $m$ equals 4 so that the second modulation frequency is $\frac{1}{4}$ that of the first frequency. The logic zero bit is shown at 145 as consisting of a first portion 146 of 12 cycles of the first frequency and a second portion 147 is shown as two cycles of the second frequency. Accordingly, $n$ equals twelve divided by 20. The clock output is shown at 70A and the shift register output is shown at row 148 when loaded with a noise free logic zero bit. From this it will be seen that during reception of the second frequency, as at portion 147 of the logic zero bit, a zero occurs on two adjacent shift register outputs and also occurs on every fourth shift register output, because $m$ equals 4, namely, the first modulation frequency is four times the second modulation frequency.

To decode the encoded train as shown in FIG. 4 there would need be no change made to the logic one bit decoder 61. The logic zero bit decoder 63 could have its input connection 140 changed to be connected to the second output of the shift register rather than to the third to decode the fact that two adjacent outputs of the shift register would at one instant have a logic zero output. The sync bit detector 62 could have its input connections changed so as to be connected to the shift register outputs to decode the condition of 0, 0, 1, 1, 0, 0, 1, 1, 0, 0, N, N, 0, 0, N, N, 0, 0, where N is any logic state either one or zero. This again would be a relatively easy internal programming change in the decoder 27. FIGS. 3 and 4 show the flexibility of the receiver circuit 25 and its ability to be readily internally programmed for different degrees of resisting false operation.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A receiver decoder for use with an encoded data train of three different logic conditions of bits, a first bit being $X$ cycles of a first higher modulation frequency, a second bit being $Y = (X/m)$ cycles of a second lower modulation frequency, and a third bit being the series combination of $nX$ cycles of said first frequency and $(1-n)(X/m)$ cycles of said second frequency, where $X$ and $Y$ are different numbers, $n$ is a number less than one and greater than zero, and $m$ is an integer other than one, said receiver decoder comprising, in combination,
a data comparator connected to receive information from said encoded data train,
programmable means connected to establish a programmable bit input,
means to establish a sequential bit count connected to control said programmable bit input to said data comparator to compare sequentially the programmable bits with the information from the encoded data train for each bit unit of time generated by said sequential bit count means,
and means to provide an output signal from said receiver decoder upon the incidence of a given number of bit groups that compare satisfactorily.

2. A receiver decoder as set forth in claim 1, wherein said programmable means includes a multiple pole switch means connected for externally programming the programmable bit input.

3. A receiver decoder as set forth in claim 1, wherein said programmable means includes internal connections in said decoder to either ground or the operating voltage to establish part of the programmable bit input.

4. A receiver decoder as set forth in claim 1, including a signal discriminator connected to receive the encoded data train and to supply information thereof to said data comparator, said signal discriminator connected to discriminate between data train signals of the first and second modulation frequencies.

5. A receiver decoder as set forth in claim 1, wherein said means to establish a sequential bit count includes means to count approximately $X$ cycles of said first high modulation frequency to establish a bit unit to time.

6. A receiver decoder as set forth in claim 1, wherein said means to establish a sequential bit count establishes a unit of time for a group of bits to control said output signal means.

7. A receiver decoder as set forth in claim 1, including a signal discriminator connected to receive the encoded data train to discriminate among said three different logic conditions of bits and connected to supply information as to the logic condition to said data comparator.

8. A receiver decoder as set forth in claim 7, wherein a logic one bit is said first bit, a logic zero bit is said third bit and a synchronization is said second bit.

9. A receiver decoder as set forth in claim 7, wherein said signal discriminator includes first, second and third decoders to decode said first, second and third bit conditions, respectively.

10. A receiver decoder as set forth in claim 9, wherein said first bit condition decoder includes a multiple input gate, a shift register, and connections from the first few sequential outputs of said shift register to the inputs of said gate to decode the occurrence on the inputs of said gate of identical logic states.

11. A receiver decoder as set forth in claim 9, wherein said third bit condition decoder includes a shift register, and a gate having multiple inputs connected to the first output and $m^{th}$ output of said shift register to decode the occurrence on the inputs of said gate of identical logic states.

12. A receiver decoder as set forth in claim 9, including a shift register having multiple outputs, a gate having multiple inputs connected to a majority of every $m^{th}$ one of said shift register outputs to decode said second bit condition.

13. A receiver decoder as set forth in claim 1, wherein said means to establish a sequential bit count includes a phase locked loop connected to receive the encoded data train and to lock on to the said first higher modulation frequency.

14. A receiver decoder as set forth in claim 13, including time delay means in said phase locked loop to maintain said phase locked loop nearly at said first higher modulation frequency despite the reception of a signal of said second lower modulation frequency.

15. A receiver decoder as set forth in claim 1, wherein said output signal means includes a first counter connected to said data comparator to count the bit groups that compare satisfactorily and including a second counter connected to said data comparator to count the bit groups that do not compare satisfactorily.

16. A receiver decoder as set forth in claim 15, including means responsive to the incidence of a given number of counts to said second counter to reset the first counter.

17. A receiver decoder as set forth in claim 15, including a means responsive to the incidence of a given number of counts to said first counter to reset said second counter.

18. A receiver for use with encoded first and second modulation frequencies comprising, in combination,
decoder means to decode three different logic conditions of bits, said decoder means including a first decoder connected to decode a first bit having $X$ cycles of a first higher modulation frequency, a second decoder connected to decode a first bit of $Y$ cycles of a second lower modulation frequency, and a third decoder connected to decode a third bit consisting of the series combination of $nX$ cycles of said first frequency and $(1-n)(X/m)$ cycles of said second frequency, where $X$ and $Y$ are different numbers, $Y = X/m$, $n$ is a number between zero and one, and $m$ is an integer other than one, said receiver further including, a data comparator connected to the output of said decoder means, programmable means to establish a programmable bit input, means to establish bit units of time to control said programmable bit input to said data comparator to compare the programmable bits with three different logic conditions of bits from said decoder means, and means to provide an output signal from said receiver upon the incidence of a given number of groups of bits that compare satisfactorily.

19. A receiver as set forth in claim 18, wherein said receiver includes an amplifier stage for a carrier, and a detector to detect the modulation signals on the carrier.

* * * * *